Figure 1:
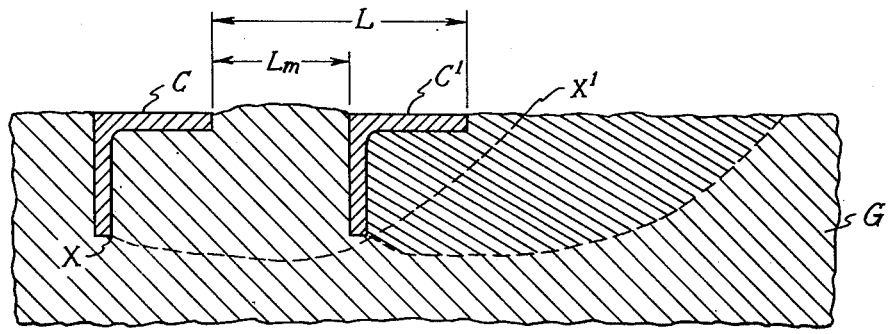

May 17, 1955

M. G. BEKKER 2,708,608

TRACTOR TRACK

Filed Aug. 26, 1953

2 Sheets-Sheet 1

INVENTOR

*Mieczyslaw G. Bekker*

BY *Bailey, Stephens & Huettig*

ATTORNEYS

May 17, 1955 — M. G. BEKKER — 2,708,608
TRACTOR TRACK
Filed Aug. 26, 1953 — 2 Sheets-Sheet 2

INVENTOR
Mieczyslaw G. Bekker
BY Bailey, Stephens & Huettig
ATTORNEYS 2,708,608

TRACTOR TRACK

Mieczyslaw G. Bekker, Washington, D. C., assignor to Her Majesty the Queen in the right of Canada as represented by the Minister of National Defence, Ottawa, Canada Application August 26, 1953, Serial No. 376,657

2 Claims. (Cl. 305—10)

This invention relates to endless tracks for vehicles. In particular, the invention is directed to the construction of the cleats or grousers in endless tracks for vehicles.

This application is a continuation-in-part of my co-pending application Serial No. 308,802, filed September 10, 1952, for "Tractor Tracks," now abandoned.

In my application for Spaced Link Track, Serial No. 175,767, filed July 25, 1950, now Patent No. 2,685,481, I disclosed the theoretical values for constructing an endless track with maximum tractive efficiency. It was pointed out that the clear distance L between adjacent cleats can be found according to the formula:

$$L = \frac{s\epsilon^{\left[\frac{270-2\theta-\phi}{114.6}\cdot\tan\phi\right]} \cdot \left(\cos\theta + \frac{h}{s}\sin\theta\right)}{\sqrt{2}\left(\cos\frac{\phi}{2} - \sin\frac{\phi}{2}\right)}$$

wherein $s$ is the width of the horizontal flange of the cleat, $\epsilon$ is the Naperian base 2.718, $h$ is the depth of the vertical flange of the cleat, $\phi$ is the angle of the internal friction of the soil, $\theta$ is the angle at which the ground bearing capacity is sloped to the perpendicular and equal to the geometrical sum of the vertical load V and the horizontal load H.

Vertical load V caused by vehicle weight matches the load carrying capacity of the track, called flotation. Horizontal load H equals to the gross tractive force which may be developed by the ground for the overcoming of the total resistance to motion, encountered by the track. This resistance is caused by the deformation, bulldozing and dragging of soil under track action, and by such external loads as for instance, hill climbing, acceleration, towing another load, wind resistance encountered by the vehicle, etc. The resultant of the graphically plotted values for H and V gives the ground bearing capacity and defines the angle $\theta$. This angle varies with the loads plotted for H and V, a new value being obtained for each condition of loading. The net tractive force is the force which remains after resistance to motion is subtracted from H.

According to the above quoted equation, each type of soil as defined by a specific angle of friction $\phi$, and each condition of loading as defined by angle $\theta$ will produce various values of distance L at which the track links should be spaced. It also should be noted that L value as determined by the above quoted equation refers to ideal conditions in which it is assumed that the adjacent cleats do not influence their respective shear lines. In practice, as it may be found from theoretical mechanics, the shear line of soil, and thus the L value, of a single isolated cleat will be slightly different from L value produced by any cleat in a group of cleats (except the first cleat which has no disturbing body ahead of it) if the latter are not so spaced that their mutual influence upon the stress field is negligible. Such a spacing varies, depending on the type of soil, and is somewhat larger than spacing L determined by the formula. The proper value may be obtained experimentally if the optimum performance in a given type of soil and given load conditions is to be achieved. A track designed with the cleats spaced a distance L calculated from the formula is not necessarily the most efficient under all soil conditions.

However, it is obviously impossible to satisfy all the possible soil and load conditions in one track design. Take for example a clay soil. It may be of such consistency that $\phi$ may be assumed equal zero. In the other extreme case of dry sandy soil, $\phi$ may reach the value of 35 degrees. This indicates that L value may vary depending on the type of soil contemplated, by a few hundred percent. Thus for example, a cleat having 4 inch wide horizontal flange ($s$) and 4 inch deep vertical flange ($h$) may necessitate spacings as different as approximately 18 inches for sand and approximately 4 inches for clay. The manufacturing of a track which can stretch, or contract is impractical. The design of different tracks for different soils also must be limited for economy reasons.

Actually, a track which operates in a plastic clay soil also is expected to operate in dry sandy soil, therefore a compromise has to be made depending on the operational preponderance of clay over sand, or vice versa. In the case of the above quoted example, any spacing L between 4 and 18 inches may be theoretically accepted. This implies that the track will not work with maximum efficiency in the sandy soil, and will be too widely spaced in clay soil, this also reducing efficiency.

The objects of this invention are to produce a track which is not dependent upon the flotation principle of design, which has a low movement resistance, and has a greater net tractive effort in soft soils than a conventional closed track of the same overall dimensions and load.

I have discovered that the disadvantage of compromising track spacing is considerably lessened by the previously mentioned effect of load condition as defined by angle $\theta$. The practical application of the formula indicates that in the case of great many vehicles, the load condition caused by increasing vehicle weight V, and specified by angle $\theta$, reduces the gross tractive force H of a spaced link track as compared to a conventional closed link track having the same overall dimensions and loads. Thus, the spacing L designed exactly in accordance with the formula for increasing weights is not the primary determining factor of track efficiency as measured in terms of gross tractive effort. The gross tractive effort is not a true measure of overall vehicle performance, and the net tractive effort must be determined. This gives some flexibility to the selection of the spacing between the cleats since load conditions and not the spacing becomes the predominant factor in track efficiency. Although the utmost care should be taken in order to provide the largest size possible cleats in order to reduce the ground load V, and the largest spacing L as determined by the contemplated extreme soil type in order to secure the highest tractive effort H, the reduction of that spacing within the prevailing load conditions and track dimensions can be quite acceptable since the spaced link track will not perform worse than a corresponding conventional closed link track. Of course an advantage is gained in having a track of less weight than a closed link track.

Now it has been found that there is an additional advantage in having a spaced link track, even in the case when its performance in traction is inferior to the performance of a corresponding conventional track. This advantage is due to the considerable reduction of motion resistance of the spaced link track in soft ground. As it was mentioned before a part of track resistance to motion is caused by the effect of deformation, bulldozing and dragging of soil by track cleats. This effect, according to theory and practice is much smaller in the case of the spaced link track than in the case of a conventional track because of a free passage and easy extrusion of soil through open spaces L, instead of compression, drag and shear through wide closed areas of a conventional track. Obviously the larger are the spaces L the smaller is the resistance in moving across the soft ground.

The upper limit of the width of the discussed openings is determined by the formula when assuming the maximum soil friction $\phi$ which practically equals 35 degrees. Since in actual experience both the user and the designer are interested in obtaining the maximum pull H, a corresponding $\theta$ value may be fixed for practical purposes. My computations show that in the case of sizeable cleat height $h$ as referred to flange width $s$, angle $\theta$ may be assumed equal in average to 22 degrees. Experience indicates that this value may be a good average; accordingly the formula may be transformed as follows:

$$L_{max} = 3.21s + 1.3h$$

The lower limit of cleat spacing depends on ground properties in which the cleats clog and pack with dirt so that no free passage of soil is possible. Logically, however, such a smallest opening should not be reduced beyond L value required by the other extreme soil in which $\phi$ equals zero. Assuming again that for practical purposes $\theta$ equals 22 degrees, the minimum spacing of the track is obtained by substituting $\phi = 0$ and $\theta = 22°$ in the equation, thus $$L_{min} = 0.65s + 0.26h$$

The spacing of track cleats enclosed between the above quoted maximum and minimum values will produce a track whose weight and motion resistance in a soft ground is more advantageous than those of a conventional closed link track.

In general, these objects are accomplished by providing sufficient cleats to give at least conventional vehicle supporting area, and then spacing the cleats so that the number of cleats necessary are arranged with maximum clear spaces between them according to the formulae $L_{max}$ and $L_{min}$. This results in cleats much longer than the width of the tread of conventional vehicles, and in a vehicle having tracks extending substantially clear across the belly of the vehicle.

Figure 3:
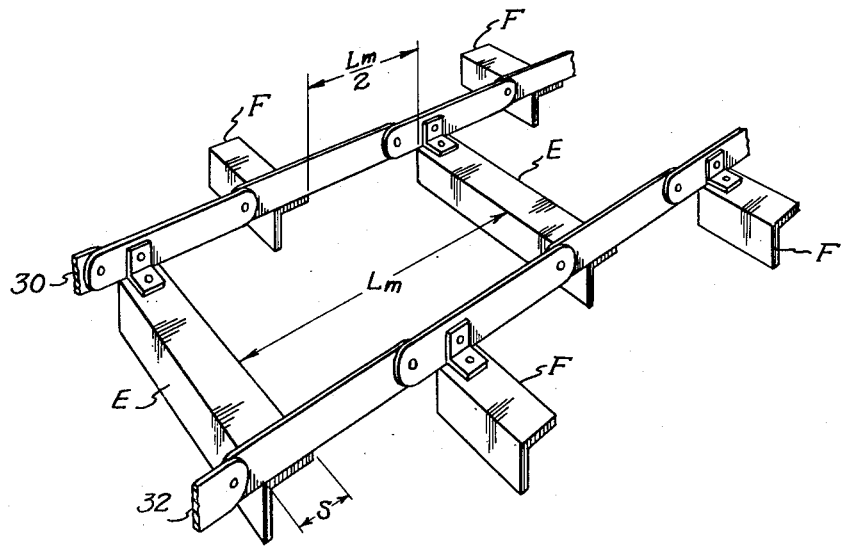
Figure 2A:
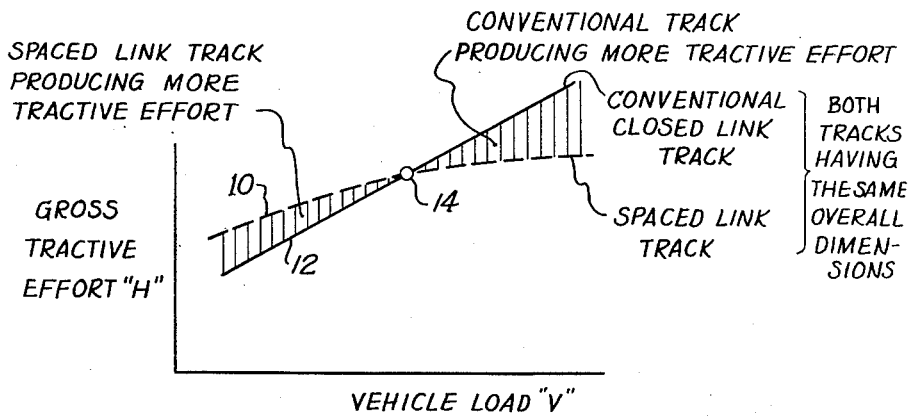

The means by which the objects of the invention are obtained are described more fully with reference to the accompanying drawings, in which:

Figure 1 is a diagrammatic illustration of the cleats engaged in the ground;

Figures 2a, b and c are graphs illustrating the comparative movement resistance of different tracks; and Figure 3 is a perspective view of one form of cleat arrangement in a tractor track.

In Figure 1 cleats C are shown engaged in the ground G. According to theoretical soil mechanics, each cleat produces a soil fracture plane extending between the points X and X'. In theory, the cleat C' should be located to the right of point X' so as to be clear of the soil fracture plane created by cleat C. According to the instant invention, it has been found that the cleat C' can be located within the line X—X'. The clear distance $Lm$ between the adjacent cleats is selected from between the $L_{max}$ and $L_{min}$ values previously determined. The spacing between the cleats reduces the motion resistance of the track by reducing the resistance of soil in passing through and underneath of track cleats. Thus tractor effort wasted in working the soil in a so-called bulldozing, compacting and shearing manner is saved to a large extent. The net tractive effort available for overcoming additional external loads as previously explained, is in consequence increased. This is illustrated by the comparative graphs of Figures 2a, b and c.

In graph 2a, the gross tractive effort H is plotted against the load V. Curve 10 illustrates the gross tractive effort obtained with increasing weights or loads when using a conventional track when the space between adjacent cleats is closed, or substantially so. Curve 12 represents, for the same loads, the tractive effort obtained with an open track designed in accordance with the formula heretofore given. For light loads, to the left of the critical point 14, the open track gives a greater tractive effort than a closed track, but beyond the critical load point 14, the closed track is more efficient.

Figure 2B:
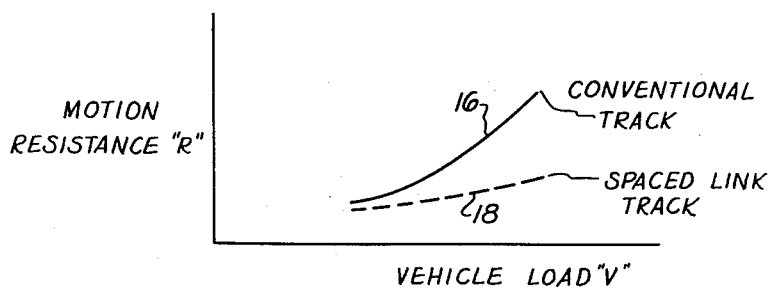
Figure 2C:
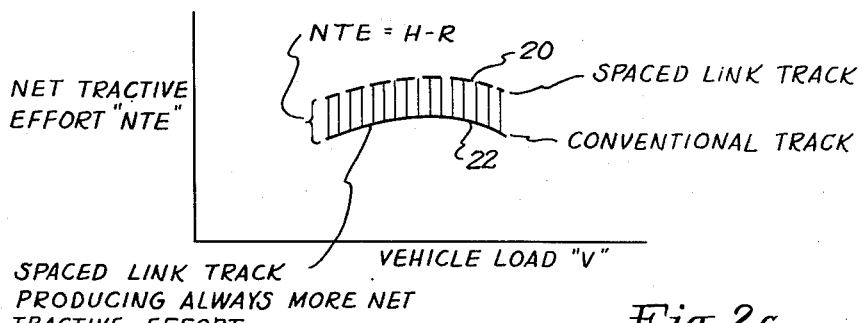

However, as shown in Figure 2b, in soft ground or mud, the resistance to movement of the track increases as the load increases. Curve 16 shows that this motion resistance increases more rapidly for a closed track than for an open track as shown by curve 18. Hence, when the corresponding values for the curves of Figure 2b are subtracted from the values of Figure 2a, as seen in Figure 2c, the net tractive effort for an open track, curve 20, is greater than that for a closed track, curve 22, when the track is operating in soft or loose soils, mud, snow, and the like. Consequently the spaced link track vehicle will climb slopes better, tow heavier additional loads, accelerate faster, etc., than a vehicle equipped with a conventional track.

The invention therefore materially differs from the so-called flotation principle of track design. Instead of closely spacing the cleats to increase the bearing area of the track or its flotation, the cleats are purposely spaced so that the open spaces amount to a sizeably large percentage of the total track area, the spacing being in accord with the maximum and minimum values determined by the aforementioned formulae for $L_{max}$ and $L_{min}$. Experiments have shown that a vehicle with an open track of this invention will travel from firm ground through wet swampy ground without any great increase in engine power, whereas a vehicle with a conventional closed track will bog down even under full engine power.

Figure 3 shows a track constructed to achieve the advantages of adequate tractive effort and low movement resistance. The angular cleats E are secured between chains 30 and 32, and are spaced a distance $Lm$ as selected between the $L_{max}$ and $L_{min}$ values. Such spacing opens the track in order to obtain a low movement resistance. Additional cleats F, of half the length of cleats E, are fastened outwardly of chains 30 and 32, these cleats lying midway of cleats E. Thus, a cleat exists every length $Lm/2$, yet the track is sufficiently open so as to have a net tractive effort in soft soils much greater than obtained by a closed track. At the same time, the track link pitch is reduced, and a more even support of the track on the ground is obtained.

Having now described the means by which the objects of the invention are obtained, I claim:

1. An endless track for a vehicle comprising a pair of endless chains, first cleats each having a horizontal flange having a width $s$ and a vertical flange having a height $h$ secured between said chains, said cleats being spaced a distance $Lm$ between their horizontal flanges, the distance ranging between the distance $L_{max}$ obtained from the formula $L_{max} = 3.21s + 1.3h$, and a distance $Lm$, obtained from the formula $L_{min} = 0.65s + 0.26h$, and said track being open between the horizontal flanges.

2. An endless track as in claim 1, further comprising second cleats secured respectively to said chains outwardly of said first cleats and spaced a distance $Lm/2$ with respect thereto.

References Cited in the file of this patent

UNITED STATES PATENTS

| | | |
|---|---|---|
| 1,560,225 | Filleul | Nov. 3, 1925 |
| 1,613,598 | Armstrong | Jan. 11, 1927 |
| 2,389,156 | Knox | Nov. 20, 1945 |